(12) United States Patent
Chen

(10) Patent No.: US 7,938,241 B1
(45) Date of Patent: May 10, 2011

(54) BICYCLE HUB THAT WILL NOT PRODUCE NOISE

(75) Inventor: Ching-Shu Chen, Changhua (TW)

(73) Assignee: Chosen Co., Ltd., Changhua Hsien (TW)

( * ) Notice: Subject to any disclaimer, the term of this patent is extended or adjusted under 35 U.S.C. 154(b) by 573 days.

(21) Appl. No.: 12/060,426

(22) Filed: Apr. 1, 2008

(51) Int. Cl.
*F16D 41/30* (2006.01)

(52) U.S. Cl. ............ 192/64; 192/46; 74/576; 301/110.5

(58) Field of Classification Search .................. 192/64
See application file for complete search history.

(56) References Cited

U.S. PATENT DOCUMENTS

| 756,086 | A | * | 3/1904 | Weiler | 192/46 |
| 1,883,966 | A | * | 10/1932 | Krause | 74/576 |
| 5,460,254 | A | * | 10/1995 | Huang | 192/64 |
| 6,155,394 | A | * | 12/2000 | Shook | 192/46 |
| 6,202,813 | B1 | * | 3/2001 | Yahata et al. | 192/64 |
| 2010/0122886 | A1 | * | 5/2010 | Chen | 192/64 |

FOREIGN PATENT DOCUMENTS

JP 56-164232 A * 12/1981

* cited by examiner

*Primary Examiner* — Richard M. Lorence
(74) *Attorney, Agent, or Firm* — Alan Kamrath; Kamrath & Associates PA

(57) ABSTRACT

A hub for a bicycle includes a shaft, a hub body, a ratchet wheel, a damper, a drive seat, and a plurality of pawl members. Thus, when the drive seat is rotatable backward, the locking detent of each of the pawl members is detached from the oneway ratchet teeth of the ratchet wheel constantly, so that each of the pawl members will not touch the ratchet wheel to prevent from incurring a noise. In addition, when the drive seat is rotatable backward, the hub body is separated from the drive seat, and rotation of the hub body will not drive the drive seat and the pedal to prevent the pedal from being driven when the hub body is rotated backward.

16 Claims, 7 Drawing Sheets

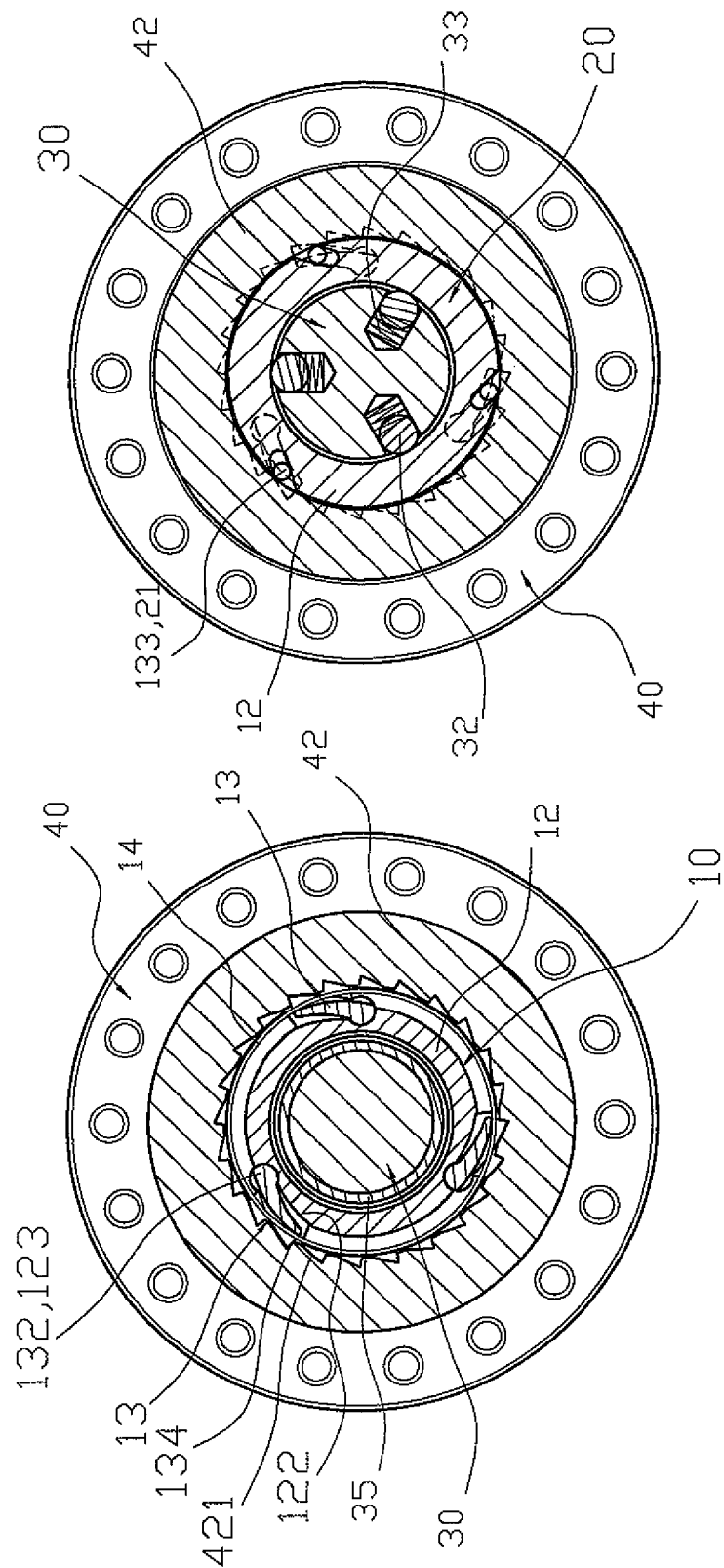

BICYCLE HUB THAT WILL NOT PRODUCE NOISE

BACKGROUND OF THE INVENTION

1. Field of the Invention

The present invention relates to a hub and, more particularly, to a hub for a bicycle.

2. Description of the Related Art

A conventional hub for a bicycle in accordance with the prior art shown in FIGS. 8 and 9 comprises a shaft 70, a hub body 60 rotatably mounted on the shaft 70, a ratchet wheel 61 secured in the hub body 60 to drive the hub body 60 to rotate relative to the shaft 70 and having an inside provided with a plurality of one-way ratchet teeth 611, a drive seat 50 rotatably mounted on the shaft 70 and having a first end provided with a support base 52 which is rotatable in the ratchet wheel 61 and has a periphery provided with a plurality of receiving slots 521, a plurality of pawl members 53 each pivotally mounted in a respective one of the receiving slots 521 of the support base 52 of the drive seat 50 and each meshing with the oneway ratchet teeth 611 of the ratchet wheel 61 so that the ratchet wheel 61 is combined with and rotatable with the support base 52 of the drive seat 50, a plurality of elastic members 54 each biased between the support base 52 of the drive seat 50 and a respective one of the pawl members 53, at least one first bearing 72 and at least one bushing 73 mounted between the drive seat 50 and the shaft 70, and at least one second bearing 720 mounted between the hub body 60 and the shaft 70. The drive seat 50 has a second end provided with a sprocket 51.

In assembly, the hub body 60 is connected to a wheel (not shown) of the bicycle, the shaft 70 is connected to a frame (not shown) of the bicycle, the sprocket 51 of the drive seat 50 meshes with and is driven by a chain (not shown) which is driven by a chainwheel (not shown) which is driven by a pedal (not shown) that is pedalled by a rider.

In operation, when the pedal is pedalled by the rider to move forward, the chainwheel is driven by the pedal to drive the chain which drives the sprocket 51 of the drive seat 50 so as to rotate the drive seat 50 forward relative to the shaft 70, so that each of the pawl members 53 is rotatable forward with the support base 52 of the drive seat 50. At this time, each of the pawl members 53 meshes with the oneway ratchet teeth 611 of the ratchet wheel 61 so that the ratchet wheel 61 is driven by each of the pawl members 53 to drive the hub body 60 to rotate relative to the shaft 70 so as to move the wheel forward.

On the contrary, when the pedal is pedalled by the rider to move backward, the chainwheel is driven by the pedal to drive the chain which drives the sprocket 51 of the drive seat 50 so as to rotate the drive seat 50 backward relative to the shaft 70, so that each of the pawl members 53 is rotatable backward with the support base 52 of the drive seat 50. At this time, each of the pawl members 53 passes by the oneway ratchet teeth 611 of the ratchet wheel 61 so that the ratchet wheel 61 is released from the oneway ratchet teeth 611 of the ratchet wheel 61. Thus, the ratchet wheel 61 together with the hub body 60 is not driven by the drive seat 50, and the drive seat 50 idles in the backward direction.

However, when each of the pawl members 53 passes by the one-way ratchet teeth 611 of the ratchet wheel 61 during the backward rotation of the drive seat 50, each of the pawl members 53 touches the oneway ratchet teeth 611 of the ratchet wheel 61 to produce noise due to the friction, thereby easily causing an uncomfortable sensation to the rider. In addition, when the hub body 60 is rotated in the backward direction (e.g., when the wheel is rotated backward by the rider), the ratchet wheel 61 is also rotated in the backward direction. At this time, each of the pawl members 53 meshes with the one-way ratchet teeth 611 of the ratchet wheel 61 so that the ratchet wheel 61 drives each of the pawl members 53 to drive the drive seat 50 to rotate relative to the shaft 70 in the backward direction. Thus, the pedal is driven by the drive seat 50 to rotate backward so that the rider is easily hit by the pedal, thereby causing danger to the rider.

BRIEF SUMMARY OF THE INVENTION

In accordance with the present invention, there is provided a hub, comprising a shaft, a hub body rotatably mounted on the shaft, a ratchet wheel secured in the hub body to drive the hub body to rotate relative to the shaft and having an inside provided with a plurality of oneway ratchet teeth, a damper mounted between the shaft and the hub body and having a periphery provided with a plurality of oblique guide slots, a drive seat rotatably mounted on the shaft and having a first end provided with a support base which is rotatable in the ratchet wheel and a periphery provided with a plurality of receiving slots, and a plurality of pawl members each pivotally mounted in a respective one of the receiving slots of the support base of the drive seat and each having a side provided with a guide post which is movable in a respective one of the oblique guide slots of the damper to drive each of the pawl members to move between a first position where each of the pawl members meshes with the one-way ratchet teeth of the ratchet wheel so that the ratchet wheel is combined with and rotatable with the support base of the drive seat and a second position where each of the pawl members is detached from the oneway ratchet teeth of the ratchet wheel so that the ratchet wheel is released from and non-rotatable with the support base of the drive seat.

The primary objective of the present invention is to provide a bicycle hub that will not produce noise.

Another objective of the present invention is to provide a hub, wherein when the pedal is driven backward and the drive seat is rotatable backward, each of the pawl members is fully hidden in the respective receiving slot of the drive seat, and the locking detent of each of the pawl members is detached from the oneway ratchet teeth of the ratchet wheel constantly, so that each of the pawl members will not touch the ratchet wheel when the drive seat is rotatable backward to prevent from incurring a noise when the pedal is driven backward.

A further objective of the present invention is to provide a hub, wherein when the drive seat is rotatable backward, each of the pawl members is fully hidden in the respective receiving slot of the drive seat, and the locking detent of each of the pawl members is detached from the oneway ratchet teeth of the ratchet wheel constantly, so that the hub body is separated from the drive seat, and rotation of the hub body will not drive the drive seat and the pedal to prevent the pedal from being driven when the hub body is rotated backward.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 2A is a side view of a damper of the hub as shown in FIG. 2.

FIG. 6 is a schematic operational view of the hub as shown in FIG. 4.

FIG. 7 is a schematic operational view of the hub as shown in FIG. 5.

FIG. 9 is a side cross-sectional assembly view of the hub as shown in

FIG. 8.

DETAILED DESCRIPTION OF THE INVENTION

Figure 2:
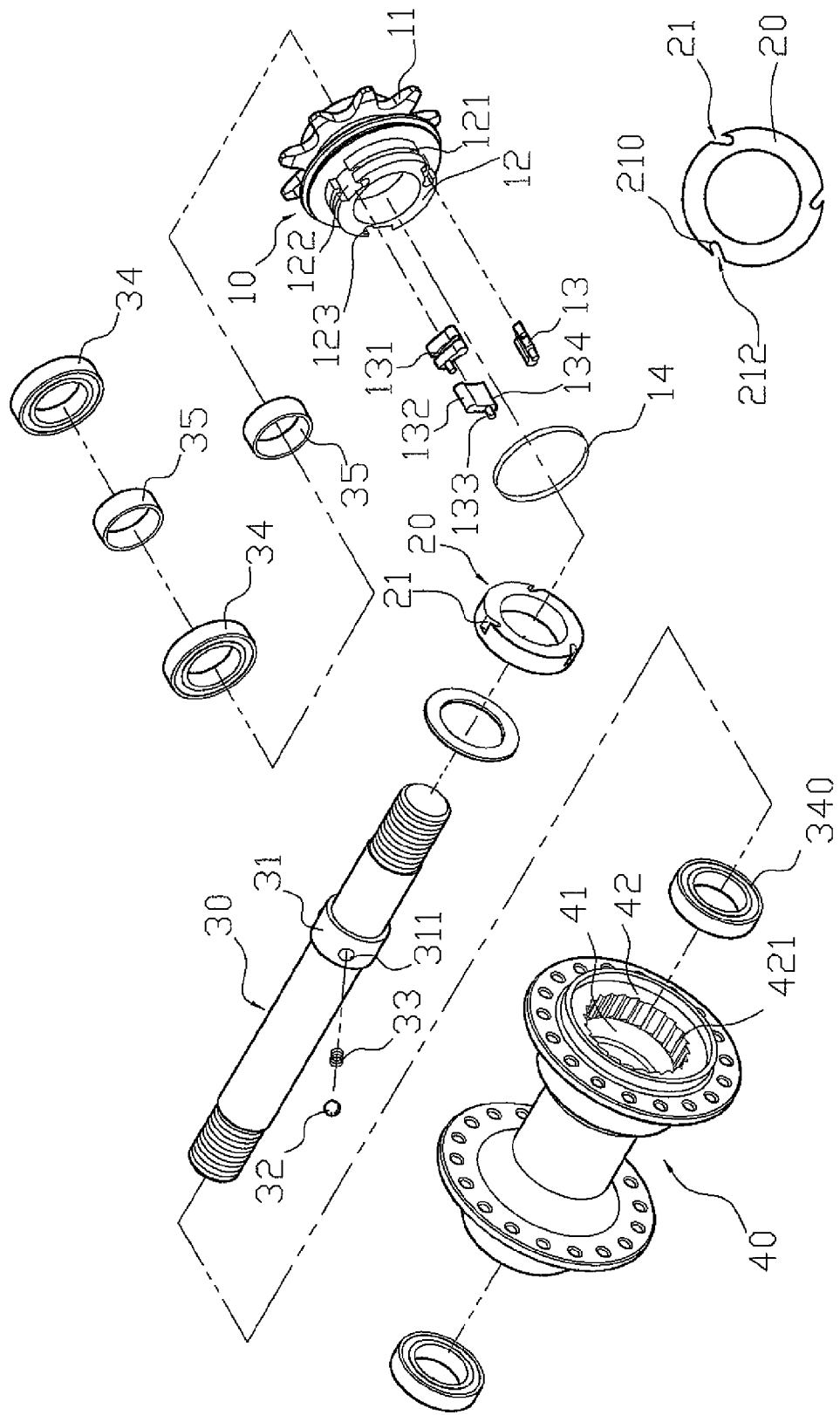
FIG. 2 is an exploded perspective view of the hub as shown in FIG. 1.
Figure 3:
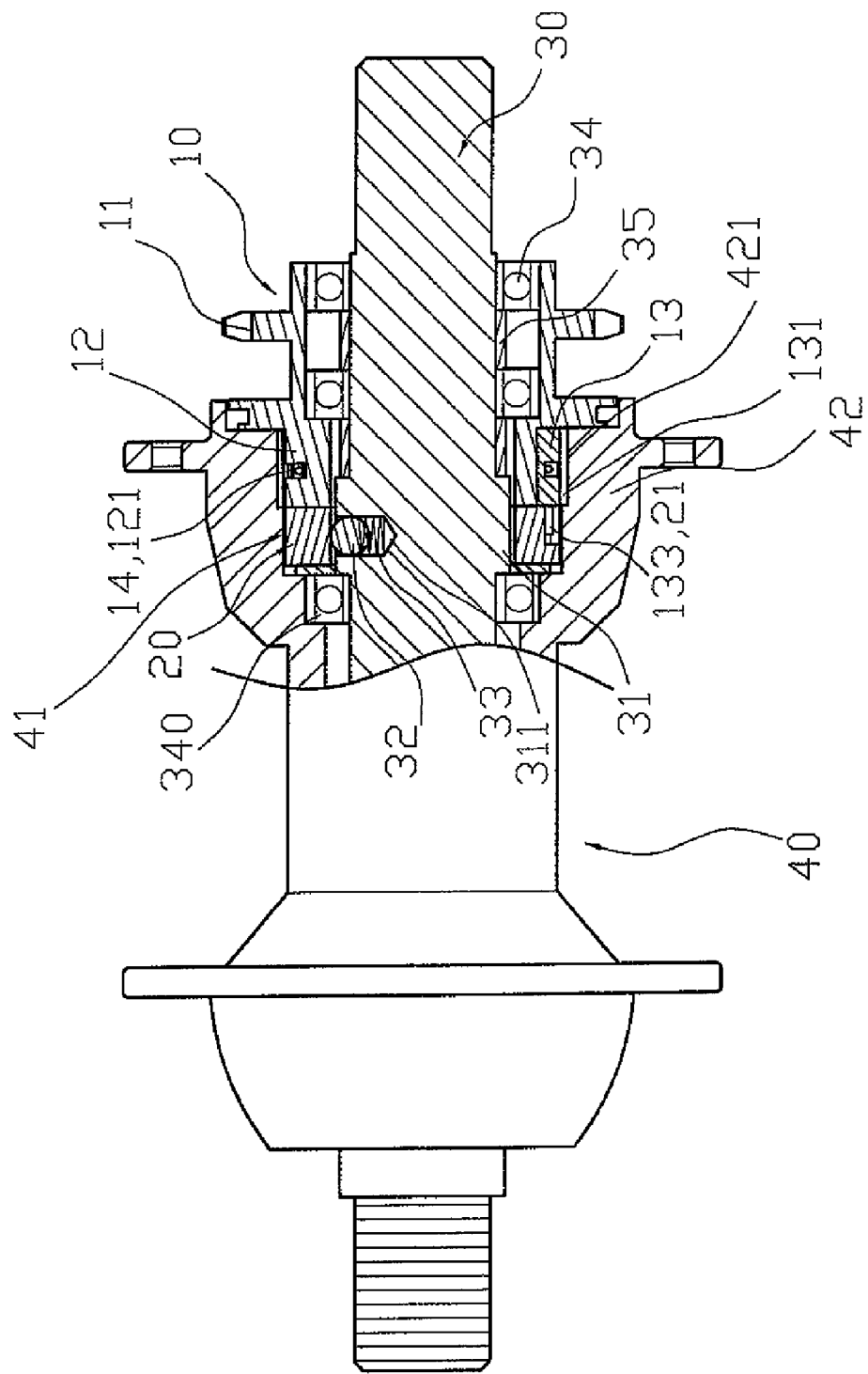
FIG. 3 is a front cross-sectional view of the hub as shown in FIG. 1.
Figure 5:
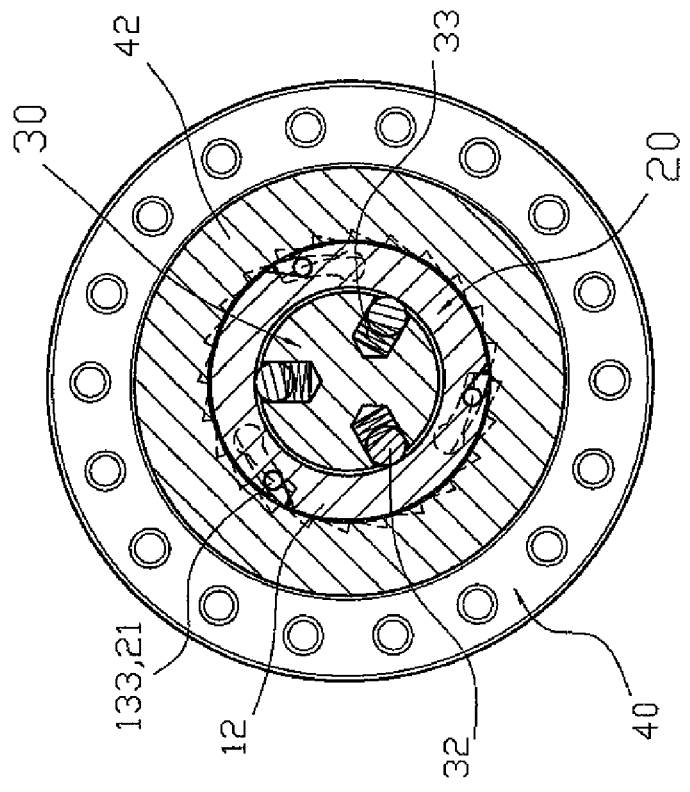
FIG. 5 is another side cross-sectional view of the hub as shown in FIG. 1.
Figure 4:
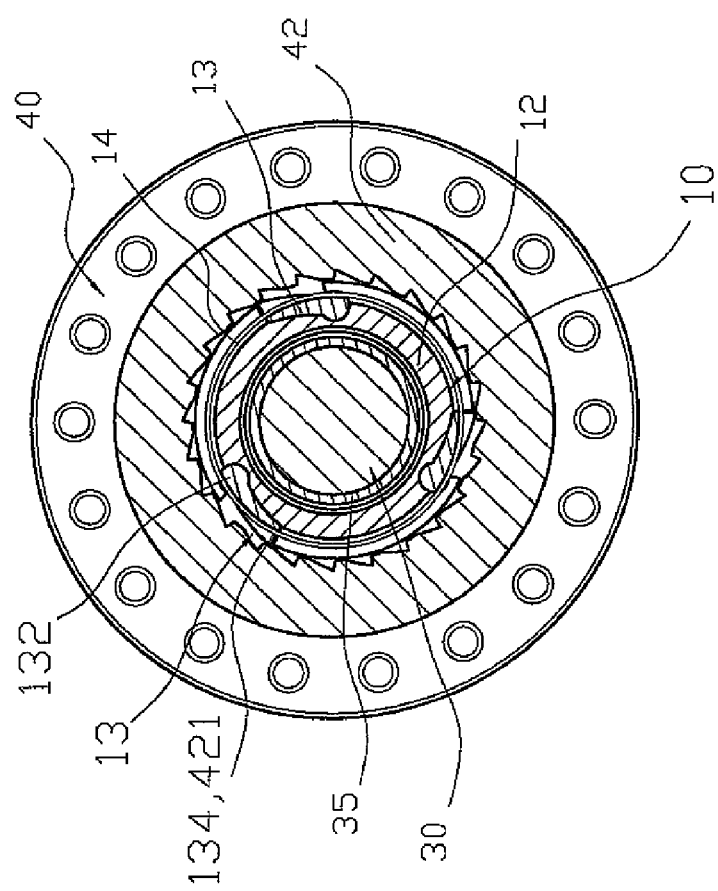
FIG. 4 is a side cross-sectional view of the hub as shown in FIG. 1.
Figure 8:
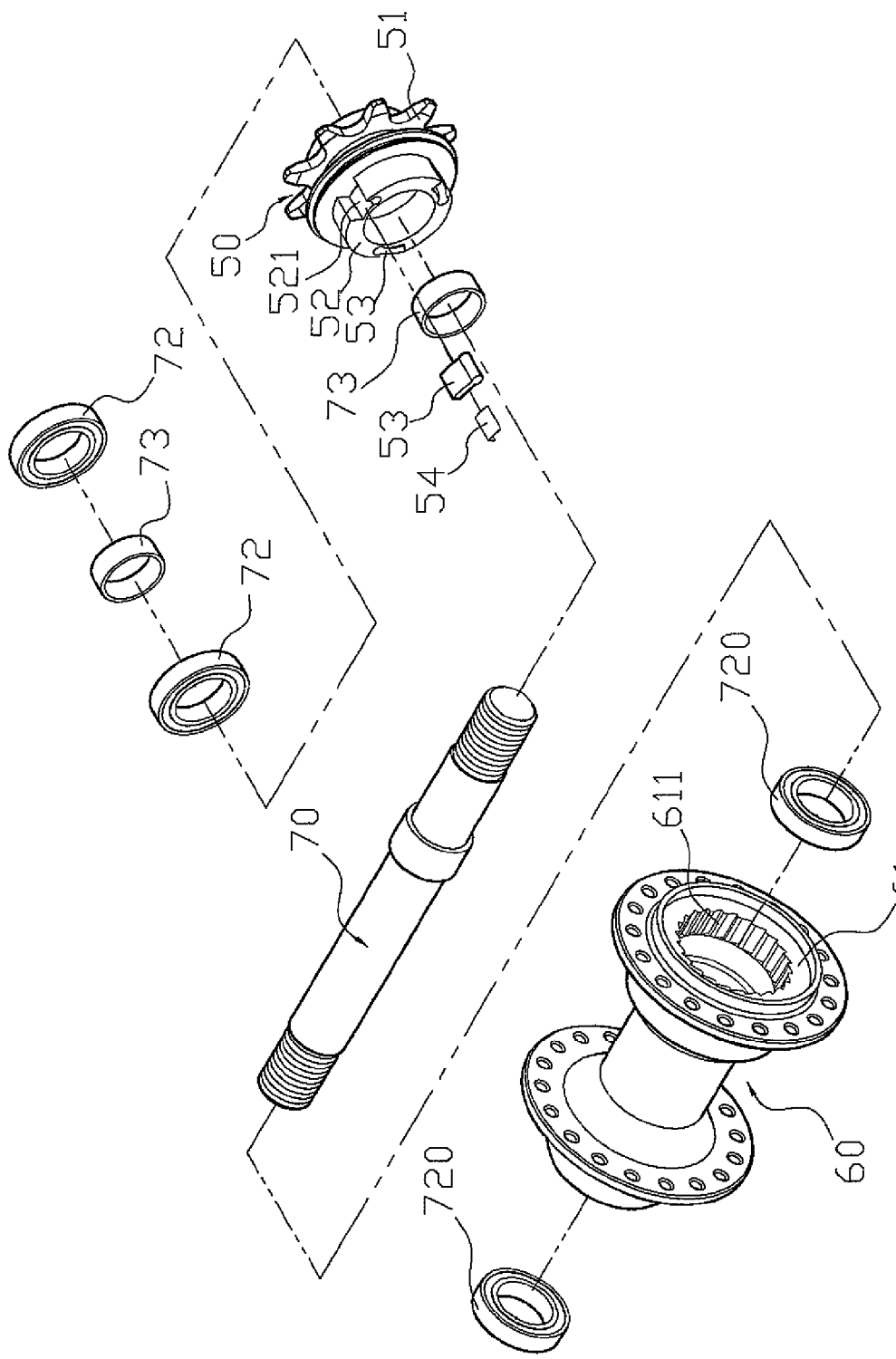
FIG. 8 is an exploded perspective view of a conventional hub in accordance with the prior art.
Figure 9:
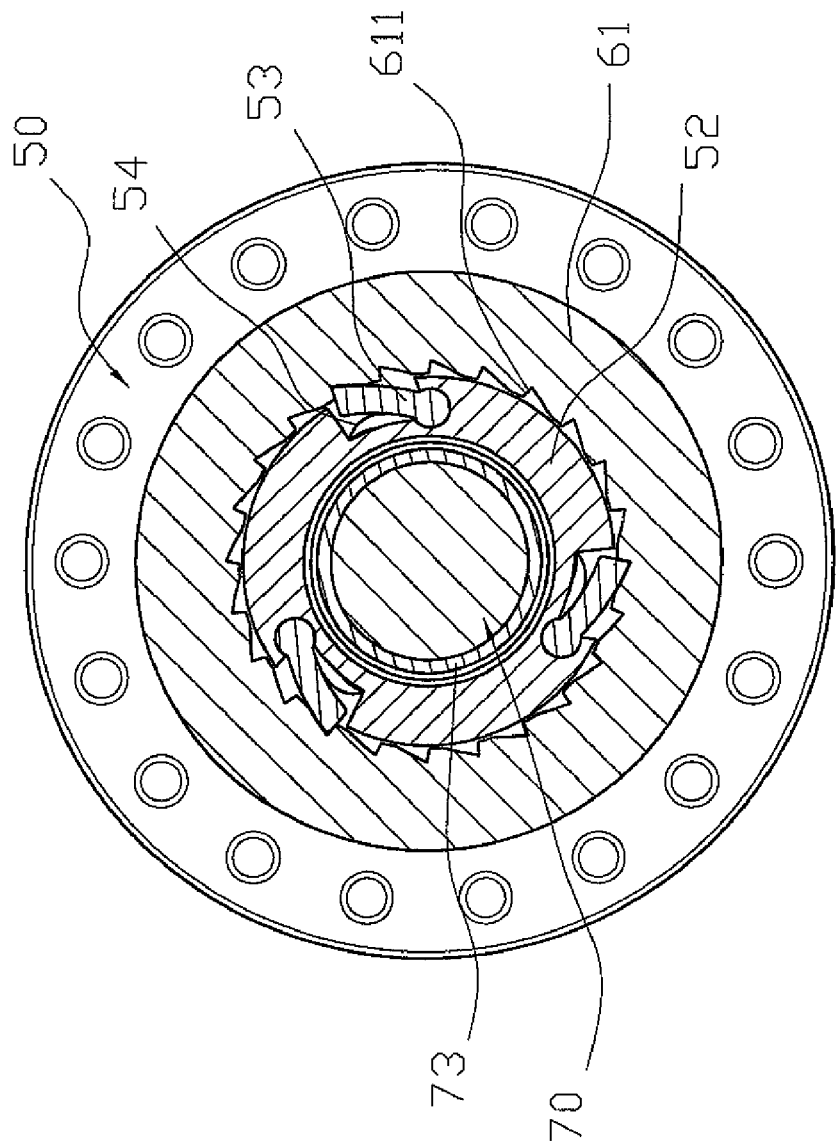

Referring to the drawings and initially to FIGS. 1-5, a hub for a bicycle in accordance with the preferred embodiment of the present invention comprises a shaft 30, a hub body 40 rotatably mounted on the shaft 30, a ratchet wheel 42 secured in the hub body 40 to drive the hub body 40 to rotate relative to the shaft 30 and having an inside provided with a plurality of oneway ratchet teeth 421, a damper 20 mounted between the shaft 30 and the hub body 40 and having a periphery provided with a plurality of oblique guide slots 21, a drive seat 10 rotatably mounted on the shaft 30 and having a first end provided with a support base 12 which is rotatable in the ratchet wheel 42 and has a periphery provided with a plurality of receiving slots 122, and a plurality of pawl members 13 each pivotally mounted in a respective one of the receiving slots 122 of the support base 12 of the drive seat 10 and each having a side provided with a guide post 133 which is movable in a respective one of the oblique guide slots 21 of the damper 20 to drive each of the pawl members 13 to move between a first position as shown in FIG. 4 where each of the pawl members 13 meshes with the oneway ratchet teeth 421 of the ratchet wheel 42 so that the ratchet wheel 42 is combined with and rotatable with the support base 12 of the drive seat 10 and a second position as shown in FIG. 5 where each of the pawl members 13 is detached from the oneway ratchet teeth 421 of the ratchet wheel 42 so that the ratchet wheel 42 is released from and non-rotatable with the support base 12 of the drive seat 10. The hub further comprises at least one bearing 34 and at least one bushing 35 mounted between the drive seat 10 and the shaft 30.

The hub body 40 has an inside provided with a stepped receiving chamber 41 located beside the ratchet wheel 42 to receive the damper 20.

The shaft 30 has a mediate portion provided with a protruding stop ring 31. The stop ring 31 of the shaft 30 has a periphery provided with a plurality of positioning holes 311.

The damper 20 has a ring shape and is frictionally mounted on the stop ring 31 of the shaft 30. The damper 20 has a diameter equal to that of the support base 12 of the drive seat 10. Each of the oblique guide slots 21 of the damper 20 has an inner side 210 and an outer side 212 as shown in FIG. 2A. A bearing 340 is mounted in the receiving chamber 41 of the hub body 40 and located between the hub body 40, the stop ring 31 of the shaft 30 and the damper 20.

The hub further comprises a plurality of positioning members 32 each mounted between the stop ring 31 of the shaft 30 and an inner wall of the damper 20 to position the damper 20 on the stop ring 31 of the shaft 30 temporarily so that the damper 20 is not rotatable relative to the shaft 30 easily and temporarily, and a plurality of elastic members 33 each biased between the stop ring 31 of the shaft 30 and a respective one of the positioning members 32 to push the respective positioning member 32 toward the damper 20. Each of the positioning members 32 is a ball or roll and is received in a respective one of the positioning holes 311 of the stop ring 31 of the shaft 30. Each of the elastic members 33 is a spring and is received in a respective one of the positioning holes 311 of the stop ring 31 of the shaft 30.

The hub further comprises a retaining member 14 encompassing the support base 12 of the drive seat 10 and each of the pawl members 13 to retain each of the pawl members 13 in the respective receiving slot 122 of the support base 12 of the drive seat 10. The retaining member 14 is preferably an annular elastic ring.

Each of the pawl members 13 has a peripheral wall provided with a retaining groove 131 to receive the retaining member 14. Each of the pawl members 13 is rotatable with the support base 12 of the drive seat 10 and is rotatable relative to the damper 20 and the shaft 30. Each of the pawl members 13 has a first end provided with a pivot fulcrum 132 pivotally mounted in the respective receiving slot 122 of the support base 12 of the drive seat 10 and a second end provided with a locking detent 134 which is movable in the respective guide slot 21 of the damper 20 to mesh with the oneway ratchet teeth 421 of the ratchet wheel 42.

The drive seat 10 has a second end provided with a sprocket 11. The support base 12 of the drive seat 10 has a substantially cylindrical shape and abuts the damper 20 so that the damper 20 is located between the hub body 40 and the support base 12 of the drive seat 10. The support base 12 of the drive seat 10 has a peripheral wall provided with a retaining groove 121 connected to the receiving slots 122 to receive the retaining member 14. Each of the receiving slots 122 of the support base 12 of the drive seat 10 has a bottom provided with a pivot hole 123 to receive the pivot fulcrum 132 of the respective pawl member 13.

In assembly, the hub body 40 is connected to a wheel (not shown) of the bicycle, the shaft 30 is connected to a frame (not shown) of the bicycle, the sprocket 11 of the drive seat 10 meshes with and is driven by a chain (not shown) which is driven by a chainwheel (not shown) which is driven by a pedal (not shown) that is pedalled by a rider.

Figure 1:
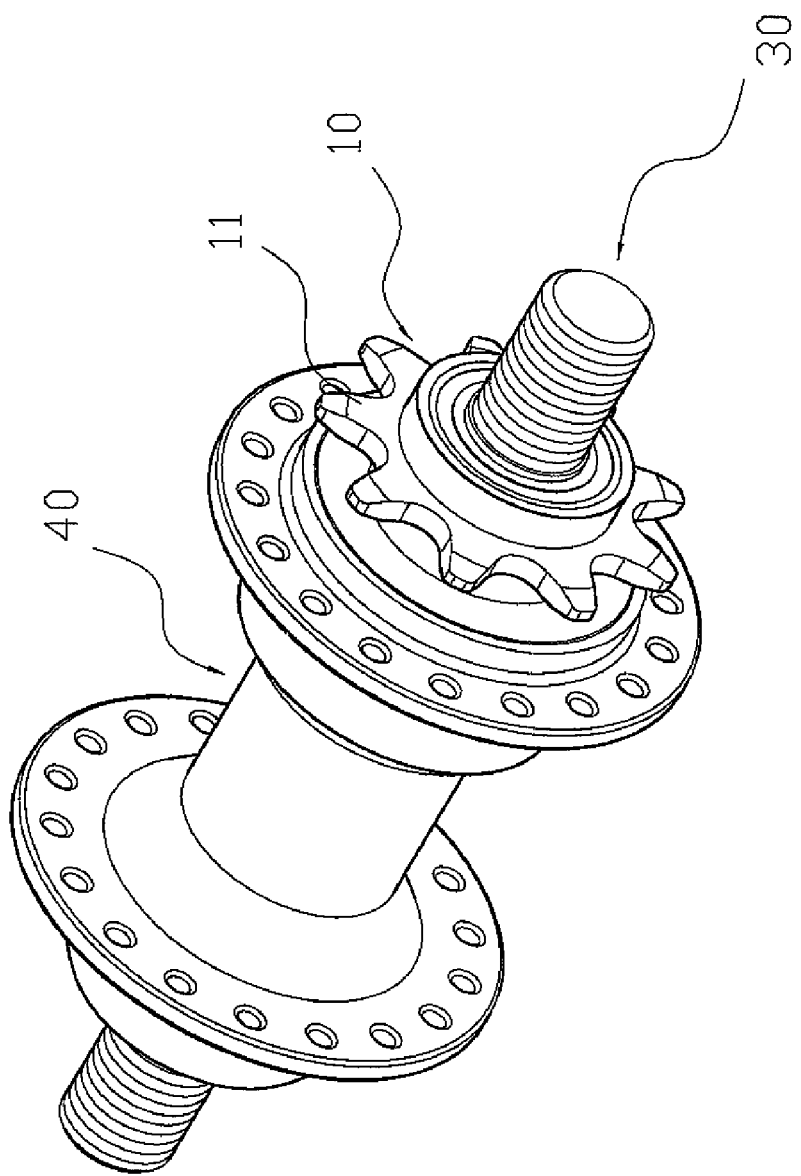
FIG. 1 is a perspective view of a hub in accordance with the preferred embodiment of the present invention.

In operation, referring to FIGS. 4 and 5 with reference to FIGS. 1-3, when the pedal is pedalled by the rider to move forward, the chainwheel is driven by the pedal to drive the chain which drives the sprocket 11 of the drive seat 10 so as to rotate the drive seat 10 forward relative to the shaft 30, so that each of the pawl members 13 is rotatable with the support base 12 of the drive seat 10 and is rotatable relative to the damper 20 and the shaft 30. At this time, the guide post 133 of each of the pawl members 13 is limited in the respective guide slot 21 of the damper 20, and the damper 20 is positioned on the stop ring 31 of the shaft 30 temporarily to provide a resistance to the guide post 133 of each of the pawl members 13, so that the guide post 133 of each of the pawl members 13 is movable in the respective guide slot 21 of the damper 20 toward the outer side 212 (see FIG. 2A) of the respective guide slot 21 when each of the pawl members 13 is rotatable relative to the shaft 30 to drive each of the pawl members 13 to pivot outwardly relative to the respective receiving slot 122 of the support base 12 of the drive seat 10, and the locking detent 134 of each of the pawl members 13 is movable outwardly relative to the respective receiving slot 122 of the support base 12 of the drive seat 10 to mesh with the oneway ratchet teeth 421 of the ratchet wheel 42 as shown in FIG. 4.

Thus, the ratchet wheel 42 is combined with and rotatable with the support base 12 of the drive seat 10, so that the ratchet wheel 42 is driven by the drive seat 10 to drive the hub body 40 to rotate relative to the shaft 30 so as to move the wheel forward. At this time, the damper 20 is driven by the guide post 133 of each of the pawl members 13 when the force applied by the drive seat 10 is greater than the friction between the damper 20 and the stop ring 31 of the shaft 30, so that the damper 20 is rotatable with the drive seat 10 and is rotatable relative to the shaft 30.

On the contrary, referring to FIGS. 6 and 7 with reference to FIGS. 1-3, when the pedal is pedalled by the rider to move backward, the chainwheel is driven by the pedal to drive the chain which drives the sprocket 11 of the drive seat 10 so as to rotate the drive seat 10 backward relative to the shaft 30, so that each of the pawl members 13 is rotatable with the support base 12 of the drive seat 10 and is rotatable relative to the damper 20 and the shaft 30. At this time, the guide post 133 of each of the pawl members 13 is limited in the respective guide slot 21 of the damper 20, and the damper 20 is positioned on the stop ring 31 of the shaft 30 temporarily to provide a resistance to the guide post 133 of each of the pawl members 13, so that the guide post 133 of each of the pawl members 13 is movable in the respective guide slot 21 of the damper 20 toward the inner side 210 (see FIG. 2A) of the respective guide slot 21 when each of the pawl members 13 is rotatable relative to the shaft 30 to drive each of the pawl members 13 to extend into the respective receiving slot 122 of the support base 12 of the drive seat 10, and the locking detent 134 of each of the pawl members 13 is movable inwardly relative to the respective receiving slot 122 of the support base 12 of the drive seat 10 to detach from the oneway ratchet teeth 421 of the ratchet wheel 42 as shown in FIG. 6. Thus, the ratchet wheel 42 is released from and not rotatable with the support base 12 of the drive seat 10, so that the ratchet wheel 42 together with the hub body 40 is not driven by the drive seat 10, and the drive seat 10 idles. At this time, the damper 20 is driven by the guide post 133 of each of the pawl members 13 when the force applied by the drive seat 10 is greater than the friction between the damper 20 and the stop ring 31 of the shaft 30, so that the damper 20 is rotatable with the drive seat 10 and is rotatable relative to the shaft 30.

In such a manner, when the pedal is driven backward and the drive seat 10 is rotatable backward, each of the pawl members 13 is fully hidden in the respective receiving slot 122 of the support base 12 of the drive seat 10, and the locking detent 134 of each of the pawl members 13 is detached from the oneway ratchet teeth 421 of the ratchet wheel 42 constantly, so that each of the pawl members 13 will not touch the ratchet wheel 42 when the drive seat 10 is rotatable backward to prevent from incurring a noise when the pedal is driven backward. In addition, when the drive seat 10 is rotatable backward, each of the pawl members 13 is fully hidden in the respective receiving slot 122 of the support base 12 of the drive seat 10, and the locking detent 134 of each of the pawl members 13 is detached from the oneway ratchet teeth 421 of the ratchet wheel 42 constantly, so that the hub body 40 is separated from the drive seat 10, and rotation of the hub body 40 will not drive the drive seat 10 and the pedal to prevent the pedal from being driven when the hub body 40 is rotated backward.

Accordingly, when the pedal is driven backward and the drive seat 10 is rotatable backward, each of the pawl members 13 is fully hidden in the respective receiving slot 122 of the drive seat 10, and the locking detent 134 of each of the pawl members 13 is detached from the oneway ratchet teeth 421 of the ratchet wheel 42 constantly, so that each of the pawl members 13 will not touch the ratchet wheel 42 when the drive seat 10 is rotatable backward to prevent from incurring a noise when the pedal is driven backward. In addition, when the drive seat 10 is rotatable backward, each of the pawl members 13 is fully hidden in the respective receiving slot 122 of the drive seat 10, and the locking detent 134 of each of the pawl members 13 is detached from the oneway ratchet teeth 421 of the ratchet wheel 42 constantly, so that the hub body 40 is separated from the drive seat 10, and rotation of the hub body 40 will not drive the drive seat 10 and the pedal to prevent the pedal from being driven when the hub body 40 is rotated backward.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A hub, comprising:
   a shaft;
   a hub body rotatably mounted on the shaft;
   a ratchet wheel secured in the hub body to drive the hub body to rotate relative to the shaft and having an inside provided with a plurality of oneway ratchet teeth;
   a damper mounted between the shaft and the hub body and having a periphery provided with a plurality of oblique guide slots;
   a drive seat rotatably mounted on the shaft and having a first end provided with a support base which is rotatable in the ratchet wheel and has a periphery provided with a plurality of receiving slots;
   a plurality of pawl members each pivotally mounted in a respective one of the receiving slots of the support base of the drive seat and each having a side provided with a guide post which is movable in a respective one of the oblique guide slots of the damper to drive each of the pawl members to move between a first position where each of the pawl members meshes with the oneway ratchet teeth of the ratchet wheel so that the ratchet wheel is combined with and rotatable with the support base of the drive seat and a second position where each of the pawl members is detached from the oneway ratchet teeth of the ratchet wheel so that the ratchet wheel is released from and non-rotatable with the support base of the drive seat;
   wherein the shaft has a mediate portion provided with a protruding stop ring; and
   the damper is frictionally mounted on the stop ring of the shaft.

2. The hub in accordance with claim 1, further comprising:
   a plurality of positioning members each mounted between the stop ring of the shaft and an inner wall of the damper to position the damper on the stop ring of the shaft temporarily and to provide a resistance to the guide post of each of the pawl members;
   a plurality of elastic members each biased between the stop ring of the shaft and a respective one of the positioning members to push the respective positioning member toward the damper.

3. The hub in accordance with claim 2, wherein
   the stop ring of the shaft has a periphery provided with a plurality of positioning holes;
   each of the positioning members is received in a respective one of the positioning holes of the stop ring of the shaft;

each of the elastic members is received in a respective one of the positioning holes of the stop ring of the shaft.

4. The hub in accordance with claim 1, further comprising:
a retaining member encompassing the support base of the drive seat and each of the pawl members to retain each of the pawl members in the respective receiving slot of the support base of the drive seat.

5. The hub in accordance with claim 4, wherein each of the pawl members has a peripheral wall provided with a retaining groove to receive the retaining member.

6. The hub in accordance with claim 4, wherein the support base of the drive seat has a peripheral wall provided with a retaining groove connected to the receiving slots to receive the retaining member.

7. The hub in accordance with claim 1, wherein each of the pawl members has a first end provided with a pivot fulcrum pivotally mounted in the respective receiving slot of the support base of the drive seat and a second end provided with a locking detent which is movable in the respective guide slot of the damper to mesh with the oneway ratchet teeth of the ratchet wheel.

8. The hub in accordance with claim 1, wherein
the support base of the drive seat abuts the damper;
the damper is located between the hub body and the support base of the drive seat.

9. The hub in accordance with claim 1, wherein
the hub body has an inside provided with a stepped receiving chamber located beside the ratchet wheel to receive the damper;
the hub further comprises a bearing mounted in the receiving chamber of the hub body and located between the hub body, the stop ring of the shaft and the damper.

10. The hub in accordance with claim 1, wherein the damper has a diameter equal to that of the support base of the drive seat.

11. The hub in accordance with claim 1, wherein the damper has a ring shape.

12. The hub in accordance with claim 1, wherein the retaining member is an annular elastic ring.

13. The hub in accordance with claim 1, wherein each of the pawl members is rotatable with the support base of the drive seat and is rotatable relative to the damper and the shaft.

14. The hub in accordance with claim 1, wherein each of the receiving slots of the support base of the drive seat has a bottom provided with a pivot hole to receive the pivot fulcrum of the respective pawl member.

15. The hub in accordance with claim 1, wherein
each of the oblique guide slots of the damper has an inner side and an outer side;
the guide post of each of the pawl members is movable in the respective guide slot of the damper between the outer side and the inner side of the respective guide slot to drive each of the pawl members to pivot relative to the respective receiving slot of the support base of the drive seat.

16. The hub in accordance with claim 1, wherein the damper is driven by the guide post of each of the pawl members when a force applied by the drive seat is greater than a friction between the damper and the stop ring of the shaft, so that the damper is rotatable with the drive seat and is rotatable relative to the shaft.

* * * * *